(12) United States Patent
Weis et al.

(10) Patent No.: US 7,118,124 B2
(45) Date of Patent: Oct. 10, 2006

(54) MOTOR VEHICLE SUBASSEMBLY

(75) Inventors: Peter Weis, Dammbach (DE); Bernd Hasselbacher, Kleinwallstadt (DE); Gunter Maierhofer, Berlin (DE); Frank Sauer, Niedernberg (DE); Gabor Palincas, Arad (RO)

(73) Assignee: Takata-Petri AG, (DE)

( * ) Notice: Subject to any disclaimer, the term of this patent is extended or adjusted under 35 U.S.C. 154(b) by 0 days.

(21) Appl. No.: 10/417,402

(22) Filed: Apr. 16, 2003

(65) Prior Publication Data

US 2004/0017068 A1 Jan. 29, 2004

(30) Foreign Application Priority Data

Apr. 16, 2002 (DE) .......................... 202 06 310 U

(51) Int. Cl.
*B60R 21/20* (2006.01)

(52) U.S. Cl. ................................ 280/730.1; 280/728.2

(58) Field of Classification Search ............... 280/731, 280/728.2, 732; 200/61.55
See application file for complete search history.

(56) References Cited

U.S. PATENT DOCUMENTS

| 5,380,037 | A | 1/1995 | Worrell et al. |
| 5,470,100 | A | 11/1995 | Gordon |
| 5,620,201 | A * | 4/1997 | Ricks .......................... 280/731 |
| 5,775,725 | A | 7/1998 | Hodac et al. |
| 6,196,573 | B1 | 3/2001 | Worrell et al. |
| 6,572,136 | B1 * | 6/2003 | Inoue et al. ............. 280/728.2 |
| 2002/0043786 | A1 | 4/2002 | Schutz |
| 2002/0153714 | A1 * | 10/2002 | Kreuzer ....................... 280/731 |

FOREIGN PATENT DOCUMENTS

| DE | 200 17 527 U1 | 3/2001 |
| EP | 1 103 430 A1 | 5/2001 |
| EP | 1 167 132 A2 | 1/2002 |
| EP | 1 179 457 A1 | 2/2002 |
| FR | 2790044 | 8/2000 |
| GB | 2336135 A * | 10/1999 |
| JP | 2001-233159 A * | 8/2001 |
| JP | 2002002433 A | 1/2002 |
| JP | 2002012112 A | 1/2002 |
| JP | 2002012117 A | 1/2002 |
| JP | 2002087284 A | 3/2002 |
| JP | 2002225661 A | 8/2002 |
| WO | WO - 00/47451 | 8/2000 |

OTHER PUBLICATIONS

English Translation of an Office Action received for corresponding Japanese Application No. 2003-110901, Sep. 9, 2005 (2 pages).

* cited by examiner

*Primary Examiner*—Ruth Ilan
(74) *Attorney, Agent, or Firm*—Fitch, Even, Tabin & Flannery

(57) ABSTRACT

A motor vehicle subassembly including a steering wheel body and an airbag module is provided with the airbag module secured to the steering wheel via latching structure at spaced fastening points that allows removal of the module from the steering wheel body by releasing it at one of the fastening points. In this manner, the latching structureneed not be actuated at the other fastening points as well for airbag module removal. In a preferred form, an actuating element such as a spring member is provided for forming part of the latching connection between the steering wheel body and the airbag module. The latching structure can include latching elements at each fastening point having associated elastic elements such as helical springs for securing the airbag module with a prestress to the steering wheel body.

19 Claims, 2 Drawing Sheets

MOTOR VEHICLE SUBASSEMBLY

BACKGROUND OF THE INVENTION

The invention relates to a motor vehicle subassembly.

A motor vehicle subassembly of this type comprises a steering wheel body of a motor vehicle steering wheel, an airbag module which can be fastened to the steering wheel body by means of a latching connection, and latching means for fastening the airbag module to the steering wheel body at at least two spaced apart fastening points. The airbag module is accordingly secured on the steering wheel body locally at a plurality of separate fastening points.

A motor vehicle subassembly of this type is disclosed, for example, in U.S. Pat. No. 5,775,725. A disadvantage of the known motor vehicle subassembly is that, in order to release the latching connection between the airbag module and steering wheel body, the latching connection has to be released at a plurality of fastening points, which requires a corresponding outlay.

The invention is based on the problem of providing a motor vehicle subassembly of the type mentioned at the beginning, in which the latching connection between the airbag module and steering wheel body can be cancelled in a simple manner.

SUMMARY OF THE INVENTION

This problem is solved according to the invention by the provision of a motor vehicle subassembly having features as described herein.

Accordingly, the latching means provided for fastening the airbag module to the steering wheel body are arranged and designed in such a manner that, after release of the latching means at one fastening point, the airbag module can be removed from the steering wheel body without actuating the latching means of the further fastening points separately. Rather, after release of the latching means at the one fastening point, the airbag module can be removed from the steering wheel body by a simple movement relative to the steering wheel body, in particular by displacing or pivoting it.

The solution according to the invention has the advantage that, in order to cancel the connection between the airbag module and steering wheel body, the latching means used for fastening the airbag module to the steering wheel body only have to be released at a single fastening point, and the connection can then be cancelled by simple movement of the airbag module.

In order to release the latching means at the one fastening point, an actuating element, for example in the form of a spring element, which preferably forms part of the latching connection can be provided there. To this end, the latching element, in the latched state, is supported on the actuating element and can be disengaged from the actuating element by moving, in particular displacing or pivoting, and, if appropriate, deforming the said actuating element, as a result of which the latching connection at the one fastening point is released. Expressed in another manner, the latching connection at the one fastening point is only in the latched state if the latching element is supported on the actuating element. Displacing or pivoting the actuating element from the position in which it can be used as a support for the latching element therefore enables the latching connection at the said fastening point to be released in a simple manner.

According to one embodiment of the invention, the actuating element is coupled not only to the one, but also to the further fastening points of the latching connection, with it also being possible for provision to be made at these further fastening points for the latching elements there to be supported in each case on the actuating element. In this case, it is envisaged that release of the latching connection at the one fastening point also enables the latching connections at the further fastening points to be released by means of the actuating element. This is achieved by a movement of the actuating element leading to the release of the latching connection at the one fastening point having the effect of moving further sections of the actuating element through which the latching connection at the further fastening points is released. There is thus a direct connection (positive coupling) between the movement of the actuating element at the one fastening point and at the further fastening points, specifically in such a manner that the latching connections at all of the fastening points can be released simultaneously if the actuating element is moved in a suitable manner. The actuating element is preferably designed here as a latching hoop which extends from the one fastening point to the further fastening points.

According to another variant of the invention, the further fastening points are configured in such a manner that the latching connection can be cancelled there by means of a movement of the airbag module relative to the steering wheel body after the latching connection at the one fastening point has been released. If the latching connection at the one fastening point has not yet been cancelled, the said fastening point prevents the said relative movement of the airbag module, with the result that the latter, in the latched state of the latching connection at the one fastening point, cannot be removed from the steering wheel body. In order to be able to take on a function here as a stop, the actuating element is preferably supported on at least one bearing surface of the steering wheel body. The further fastening points can be assigned openings, for example in the form of a respective slot, which make it possible for the airbag module to be removed from the steering wheel body by means of a relative movement along a certain direction, with it being possible for the said direction to be predetermined, for example, by means of the direction of extent of the slots.

The latching means can be formed at the individual fastening points in each case by means of separate latching elements, in particular in the form of latching hooks, which engage in a respectively assigned latching opening.

Furthermore, elastic means can be provided via which the airbag module is supported under prestress on the steering wheel body. These elastic means can be formed in a simple manner by individual elastic elements at the respective fastening points, with the elastic elements preferably being arranged on the latching elements at the respective fastening points. For this purpose, the elastic elements can in each case be helical springs which are pushed over the latching elements.

The elastic elements enable the latching means, in particular in the form of individual latching elements, to be clamped in their respective latching position, with the result that the latching connection can only be released by a movement of the actuating element perpendicular with respect to the direction of the prestress.

BRIEF DESCRIPTION OF THE DRAWINGS

Further features and advantages of the invention will become clear in the following description of exemplary embodiments with reference to the figures, in which.

DETAILED DESCRIPTION OF THE PREFERRED EMBODIMENTS

Figure 1:
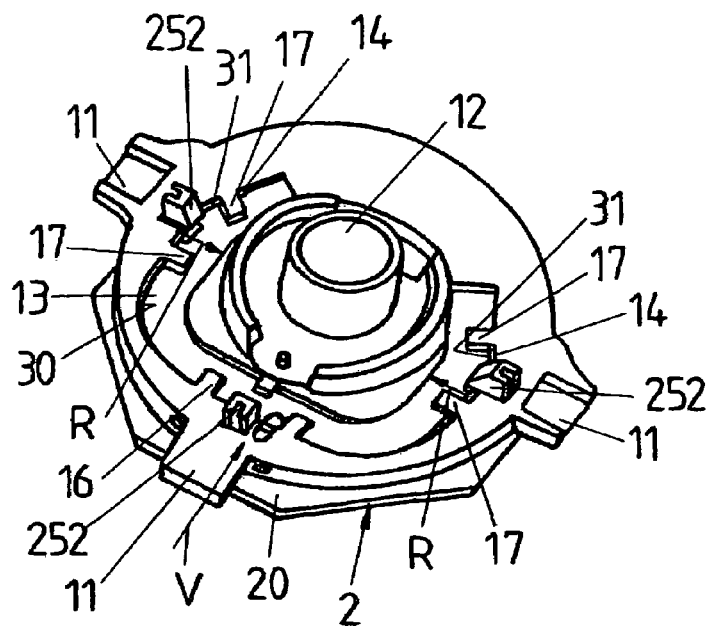
FIG. 1 shows a perspective illustration of a steering wheel body having a subassembly of an airbag module fastened thereto.
Figure 2:
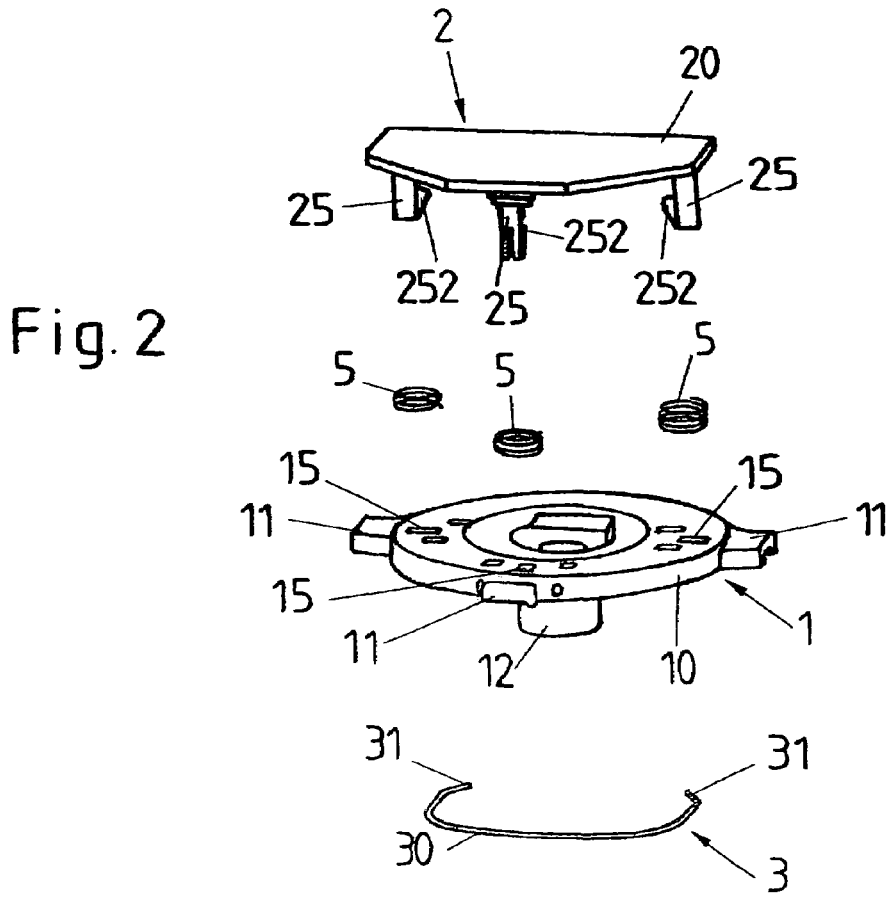
FIG. 2 shows an exploded illustration of the arrangement from FIG. 1.

FIGS. 1 and 2 illustrate a steering wheel body 1 having a flat, circular main body 10, having three holders 11, which protrude therefrom in the plane of the main body 10, for steering wheel spokes, and having a hub part 12 which protrudes vertically from the main body 10, the main body 10 of the steering wheel body also having three fastening openings 15 which are spaced apart from one another along the circumference of the main body and are intended for fastening a module carrier 2 of an airbag module.

The module carrier 2 is formed by a main body 20 which is of flat design and from which three latching, elements 25 protrude vertically in the form of latching hooks which can be introduced into a respectively assigned fastening opening 15 of the steering wheel body 2. Arranged in each case on the latching hooks 25 are elastic elements (compression springs) in the form of helical springs 5 via which the main body 20 of the module carrier 2 is supported resiliently on the main body 10 of the steering wheel body 1. The prestressing force of the elastic elements which are arranged on the latching hooks 25 between the two main bodies 1, 2 and are in the form of helical springs 5 also result in the latching connection formed by the latching hooks 25 in the assigned fastening openings 15 being clamped in place and thus counteracts release of the latching connection.

As can be seen in particular with reference to FIG. 1, the latching hooks 25 are supported with their latching heads 252 not directly on the edge of the respectively assigned fastening opening 15, but rather on a longitudinally extended, hoop-shaped spring element 3, which is inserted into a depression 13 in the steering wheel body and is retained there by projections 16, 17 protruding above the depression 13. The hoop-shaped main body 30 of the spring element 3 has respectively inwardly angled end sections 31 at its ends. The end sections 31 are supported on a correspondingly inwardly angled section 14 of the side wall of the depression 13 of the steering wheel body 1.

The depression 13 in the steering wheel body 1 and the spring element 3 having the hoop-shaped main body 30 are designed in such a manner that two of the fastening points 15, 25, comprising in each case a latching hook 25 having an assigned fastening opening 15, are arranged in the vicinity of an angled, free end section 31 of the spring element 3. In contrast, a fastening point 15, 25 is provided in the central region of the main body 30 of the spring element 3 between the two angled end sections 31.

In order to release the latching connection (illustrated in FIGS. 1 and 2) of a module carrier 2 to a steering wheel body 1, the spring element 3 is displaced in the region of the one, central fastening point 15, 25 along a displacement direction V perpendicular with respect to the direction along which the latching hook 25 can be introduced into the assigned fastening opening 15. This causes the latching head 252 of the corresponding latching hook 25 to be disengaged from the main body 30 of the spring element 3 and the latching connection is released at the corresponding fastening point 15, 25 (latching point).

The movement of the main body 30 of the spring element 3 along the displacement direction V perpendicular with respect to the direction in which the latching hook 25 is introduced and away from the side wall of the depression 13, against which the main body 30 bears, moreover, because the inwardly angled, free end sections 31 of the spring element 3 interact with the assigned wall sections 14 of the depression 13, has the result that, also in the region of the two further fastening points 15, 25, the main body 30 of the spring element 3 is moved perpendicular with respect to the direction in which the respective latching hook 25 is introduced and is moved inwards away from the wall 14 of the depression 13 in the radial direction R, so that the two further latching hooks 25 are also disengaged from the spring element 3. By this means, the latching connection is automatically also released at these two fastening points 15, 25, and the module carrier 2 of the airbag module can be removed in a simple manner from the main body 10 of the steering wheel body 1 by the latching hooks 25 being guided through the respectively assigned fastening opening 15. For this purpose, the fastening openings 15 are dimensioned in such a manner that the respective latching head 252 can be passed in a simple manner through the respective fastening opening 15 if it is not supported on the main body 30 of the spring element 3.

As a result, it is thus achieved that actuation of the latching connection, which is effective at all three fastening points 15, 25, at just one fastening point, specifically displacement of an actuating element in the form of a spring element 3 along a displacement direction V, enables the latching connection to be automatically released at all three fastening points. For this purpose, the one fastening point 15, 25 is coupled to the further fastening points 15, 25 via the actuating element in the form of the spring element 3.

Figure 3:
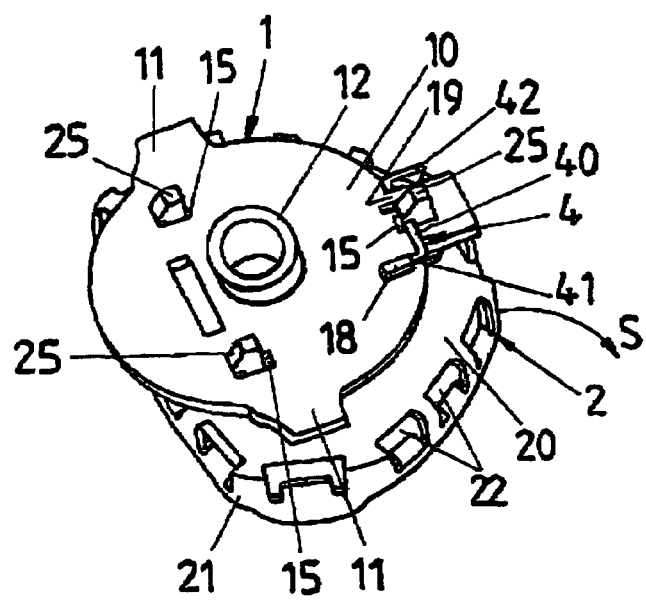
FIG. 3 shows a perspective illustration of a second embodiment of a steering wheel body having a module holder, which is fastened thereto, for an airbag module.
Figure 4A:
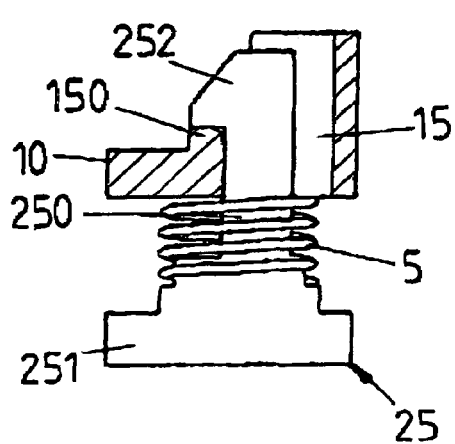
FIGS. 4a and 4b each show a detail from FIG. 3 at a fastening point for latching the module holder to the steering wheel body.
Figure 4B:
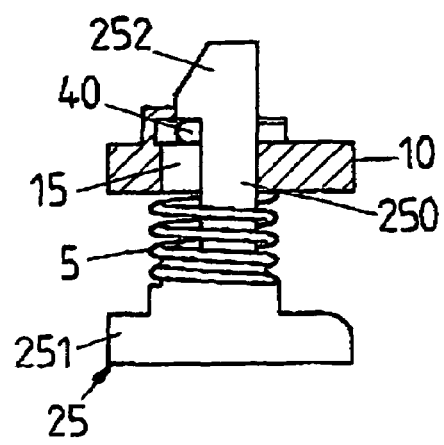

A modification of the exemplary embodiment from FIGS. 1 and 2 is illustrated in FIGS. 3, 4a and 4b, in which the substantial difference resides in the arrangement and design of the actuating element 4 which is to be actuated in order to release the latching connection. Otherwise, the two exemplary embodiments correspond, with the result that reference is made in respect of the further details to the corresponding explanations given under FIGS. 1 and 2. Corresponding components are provided in FIGS. 1 and 2, on the one hand, and in FIGS. 3, 4a and 4b, on the other hand, with identical reference numbers in each case.

It should also first be mentioned that, in the case of the exemplary embodiment according to FIG. 3, it is also possible to see, from the main body 20 of the module holder 2 to be fastened to the steering wheel body 1, a laterally upwardly protruding edge 21 having latching openings 22 for the fastening of a module cover.

In the case of the exemplary embodiment according to FIG. 3, an actuating element 4 is arranged only in the region of a fastening point 15, 25, in which, according to FIG. 4b, at this fastening point 15, 25 the fastening head 252 of the latching hook 25 is supported on the main body 40 of the actuating element in the form of a spring element 4.

It can furthermore be seen with reference to FIG. 4b that the fastening hook 25 engages with a stem 250 around the assigned latching opening 15 in the main body 10 of the steering wheel body 1 and that an elastic element, arranged on the stem 250, in the form of a helical spring 5 is supported at one end on the main body 10 of the steering wheel body 1 and at the other end on the module end 251 of the latching hook 25. The module holder 2 is thereby mounted elastically on the steering wheel body 1. At the same time, the prestressing force of the helical spring 5 which is under prestress (compression spring) results in the latching head 252 of the latching hook 25 being pressed under prestress against the main body 40 of the spring element 4, so that the latching connection is secured against being released unintentionally.

It emerges from FIG. 3 that the main body 40 of the spring element 4 has two angled end sections 41, 42, of which the one is supported on a stop 18 of the main body 10 of the steering wheel body 1. Furthermore, a further section of the main body 40 of the spring element 4, which section is adjacent to the second, angled end section 42, is guided in a tab 19 integrally formed on the steering wheel body 1. The spring element 4 is thereby supported on the main body 10 of the steering wheel body 1, in particular on the stop 18 integrally formed thereon, and on the tab 19 in such a manner that it prevents the latching element 25 from being displaced in the plane of the main body 10 of the steering wheel body 1.

It can be seen with reference to FIG. 4a that at the two further fastening points 15, 25 the latching hooks 25 are supported with their latching heads 252 in each case directly on the edge 150 of the respectively assigned fastening opening 15.

In order to release the latching connection illustrated in FIGS. 3, 4a and 4b, first of all the spring element 4 provided at the one fastening point 15, 25 is actuated, with the elasticity (deformability) of the spring element 4 being used in order, on the one hand, to lift it off from the stop 18 at the one free end 41 and, on the other hand, to move it perpendicular with respect to the direction in which the latching hook 25 is introduced into the assigned fastening opening 15 in such a manner that the latching head 252 of the latching hook 25 is disengaged from the main body 40 of the spring element 4. By this means, the latching connection at the one fastening point 15, 25 is released. At the same time, the module holder 2 can be displaced relative to the main body 10 of the steering wheel body 1 in the plane of extent of the main body 10. As a result, the module holder 2 can be removed from the steering wheel body 1 by a pivoting movement S, which is composed of a displacing movement in the plane of extent of the main body 10 of the steering wheel body 1 and of a movement perpendicular with respect thereto, in which case the latching hooks 25 are guided with their latching heads 252 through the respectively assigned fastening openings 15. The fastening openings 15 are designed for this purpose as slots having a sufficiently large extent (length).

As a result, the effect also thus achieved in the case of the exemplary embodiment illustrated in FIGS. 3, 4a and 4b is that, in the case of a latching connection in which a module holder 2 is connected to the steering wheel body 1 at three fastening points 15, 25, acting on an actuating element 4 in the form of a spring element at just one of the fastening points 15, 25 causes the latching connection at all three fastening points 15, 25 to be cancelled in such a manner that the module holder can be removed from the steering wheel body 1 by means of a simple pivoting movement S.

The invention claimed is:

1. Motor vehicle subassembly comprising:
   a steering wheel body having a main body portion including latching openings and generally extending in a lateral direction, and a hub portion generally extending in an axial direction transverse to the lateral direction,
   an airbag module subassembly which can be fastened to the steering wheel body by means of a latching connection, and
   latching means including the latching opening for fastening the module subassembly to the steering wheel body at at least two spaced apart fastening points,
   wherein the latching means are arranged and designed in such a manner that release of the latching means at one fastening point enables the module subassembly to be removed from the steering wheel body, each latching means includes a portion that engages into a corresponding one of the latching openings of the steering wheel body in a direction of insertion which is generally parallel to or aligned with the axial direction, and
   the fastening points other than the one fastening point are designed in such a manner that the latching connection can be cancelled there by a predetermined movement of the module subassembly relative to the steering wheel body if the latching connection at the one fastening point has been released.

2. Motor vehicle subassembly according to claim 1, including an actuating element at the one fastening point for releasing the latching means at this fastening point.

3. Motor vehicle subassembly according to claim 2, wherein the actuating element comprises a spring element.

4. Motor vehicle subassembly according to claim 2, wherein the actuating element is part of the latching connection.

5. Motor vehicle subassembly according to claim 4, wherein the latching means portion includes a latching element of the latching means that is arranged at the one fastening point and is supported on the actuating element in a latched state.

6. Motor vehicle subassembly according to claim 5, wherein movement of the actuating element enables the latching element to be disengaged from the actuating element as a result of which the latching connection at the one fastening point can be released.

7. Motor vehicle subassembly according to claim 2, wherein the latching means at the one fastening point can be released by displacing or pivoting the airbag module subassembly, or by deforming the actuating element.

8. Motor vehicle subassembly according to claim 2, wherein a predetermined movement of the actuating element takes place perpendicular with respect to the direction of a prestress provided by the latching means.

9. Motor vehicle subassembly according to claim 1, including elastic means via which the module subassembly is supported on the steering wheel body.

10. Motor vehicle subassembly according to claim 9, wherein the elastic means counteract a release of the latching connection between the module subassembly and steering wheel body.

11. Motor vehicle subassembly according to claim 9, wherein the elastic means are formed by elastic elements at the individual fastening points.

12. Motor vehicle subassembly according to claim 11, wherein the elastic means are arranged on latching elements at the individual fastening points.

13. Motor vehicle subassembly according to claim 11, wherein the elastic elements are in each case formed by a helical spring.

14. Motor vehicle subassembly according to claim 1, including an actuating element that acts as a stop which prevents the relative movement.

15. Motor vehicle subassembly according to claim 14, wherein the actuating element is supported on at least one supporting surface of the steering wheel body.

16. Motor vehicle subassembly according to claim 1, wherein the latching openings at the fastening points make the relative movement possible.

17. Motor vehicle subassembly according to claim 1, wherein at the plurality of fastening points the latching means in each case having latching elements which engage in a respective one of the latching openings.

18. Motor vehicle subassembly according to claim 17, wherein the latching elements comprise latching hooks.

19. Motor vehicle subassembly according to claim 1, wherein the relative movement is prevented by the one fastening point if the latching connection has not been released there.

* * * * *